United States Patent
Goto

(10) Patent No.: US 7,103,758 B2
(45) Date of Patent: Sep. 5, 2006

(54) MICROCONTROLLER PERFORMING SAFE RECOVERY FROM STANDBY MODE

(75) Inventor: Toshinori Goto, Miyazaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 788 days.

(21) Appl. No.: 10/045,101

(22) Filed: Jan. 15, 2002

(65) Prior Publication Data

US 2002/0129185 A1 Sep. 12, 2002

(30) Foreign Application Priority Data

Feb. 19, 2001 (JP) ......................... 2001-041982

(51) Int. Cl.
 *G06F 9/48* (2006.01)
 *G06F 13/24* (2006.01)
 *G06F 13/42* (2006.01)

(52) U.S. Cl. .................. 712/246; 712/247; 712/248; 712/229; 710/261; 710/262; 714/15; 713/401; 713/601

(58) Field of Classification Search .............. 712/229, 712/246, 247, 248; 710/261, 262, 24, 59; 714/15; 713/401, 601

See application file for complete search history.

(56) References Cited

U.S. PATENT DOCUMENTS

| 5,564,028 | A | * | 10/1996 | Swoboda et al. ........... 712/227 |
| 5,701,480 | A | * | 12/1997 | Raz .......................... 718/101 |
| 5,925,139 | A | * | 7/1999 | Yamada et al. ............... 714/14 |
| 6,334,167 | B1 | * | 12/2001 | Gerchman et al. .......... 711/106 |

* cited by examiner

*Primary Examiner*—Daniel H. Pan
(74) *Attorney, Agent, or Firm*—Rabin & Berdo, PC

(57) ABSTRACT

A microcontroller has a memory storing a program with an instruction that causes the microcontroller's central processing unit to enter a standby mode, in which data output from the memory is halted. The standby mode is exited by input of an interrupt. The microcontroller also has a control circuit that, by storing the next few program instructions internally before placing the memory in standby, or by delaying the interrupt signal, provides extra time for memory operation to stabilize on exit from the standby mode. Malfunctions on recovery from standby are thereby prevented, and the microcontroller can conserve power by placing the memory in a deep standby mode with a comparatively long recovery time.

7 Claims, 8 Drawing Sheets

MICROCONTROLLER PERFORMING SAFE RECOVERY FROM STANDBY MODE

BACKGROUND OF THE INVENTION

The present invention relates to a microcontroller, more particularly to a microcontroller with reduced power consumption.

Referring to FIG. 1, a conventional microcontroller has a central processing unit (CPU) 1 and a read-only memory (ROM) 2. The data stored in the ROM 2 include a program that, when executed by the CPU 1, controls peripheral circuits (not visible) in the microcontroller, enabling the microcontroller to communicate with the outside world and perform various useful functions. Program instructions and other data read from the ROM 2 are passed to the CPU 1 through a data latch 3.

The ROM 2 has an enable terminal (CE) that receives a stop signal (STP) from the CPU 1. While the stop signal is at the low logic level, the ROM 2 is enabled and provides data (DAT) to the data latch 3 in response to address signals (ADR) received from the CPU 1. When the stop signal is at the high logic level, the ROM 2 conserves power by withholding data output. The data latch 3 also receives the stop signal. When the stop signal is at the low logic level, the data latch 3 operates transparently, passing the data (DAT) received from the ROM 2 immediately to the CPU 1. When the stop signal goes high, the data latch 3 holds and continues to output the last data (DAT) received while the stop signal was low. The state in which the stop signal is at the high logic level will be referred below to as a standby mode.

Normally, the CPU 1 holds the stop signal STP at the low logic level and executes instructions read sequentially from the ROM 2. From time to time, the CPU 1 issues a control command to a peripheral circuit, then sets the stop signal to the high logic level, stops program execution, and enters the standby mode to wait for the peripheral circuit to finish processing the command. Power is conserved because the ROM 2 also enters the standby mode.

When the peripheral circuit finishes processing the command, it sends the CPU 1 an interrupt signal (not shown), causing the CPU to resume program execution. Specifically, the CPU 1 reads the instruction held in the data latch 3 and sets the stop signal to the low logic level. The ROM 2 then resumes output of data (DAT) in response to further address signals received from the CPU 1.

Among the types of ROM employed in microcontrollers, one of the most advantageous is flash ROM, which is nonvolatile but can be electrically erased and reprogrammed. Flash ROM has a regular standby mode and a deep standby mode. Power consumption is greatly reduced in the deep standby mode, but recovery from that mode to the normal operating mode takes extra time. If the deep standby mode is employed in a conventional microcontroller, then when the CPU comes out of standby and attempts to read further instructions from the flash ROM, the flash ROM may be unstable and unable to provide correct output. To avoid consequent malfunctions, conventional microcontrollers employ the flash ROM's regular standby mode, which yields a comparatively modest reduction in power consumption.

SUMMARY OF THE INVENTION

An object of the present invention is to prevent malfunctions when a microcontroller recovers from a standby mode to a normal operating mode.

Another object of the invention is to enable a microcontroller to employ the deep standby mode of flash ROM.

The invented microcontroller includes a central processing unit (CPU), a memory, and a control circuit. The CPU executes a program including an instruction causing the CPU to activate a halt signal, stop executing the program until an interrupt signal is received, then inactivate the halt signal. The memory stores data, including the program executed by the CPU, and receives a mode signal. When the mode signal is inactive, the memory outputs the stored data. When the mode signal is active, the memory discontinues output of the stored data.

According to a first aspect of the invention, when the halt signal is activated, the control circuit reads and internally stores a certain part of the program, then activates the mode signal- When the halt signal is inactivated, the control circuit inactivates the mode signal and supplies the CPU with the internally stored part of the program.

According to a second aspect of the invention, the interrupt signal is passed to the CPU through the control circuit. When the halt signal is activated, the control circuit activates the mode signal. When the interrupt signal is received, the control circuit inactivates the mode signal, waits for the memory to resume data output, then sends the interrupt signal to the CPU.

In both aspects of the invention, the memory does not have to produce output data as soon as the mode signal is inactivated. Malfunctions due to unstable operation of the memory just after the mode signal is inactivated are therefore prevented, and if flash ROM is used as the memory, the mode signal can place the memory in a deep standby mode.

DETAILED DESCRIPTION OF THE INVENTION

Figure 1:
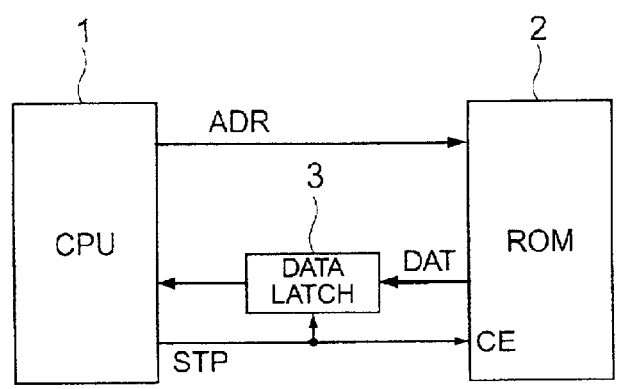
FIG. 1 is a block diagram of a conventional microcontroller.

Embodiments of the invention will be described with reference to the attached drawings, in which like parts are indicated by like reference characters.

Figure 2:
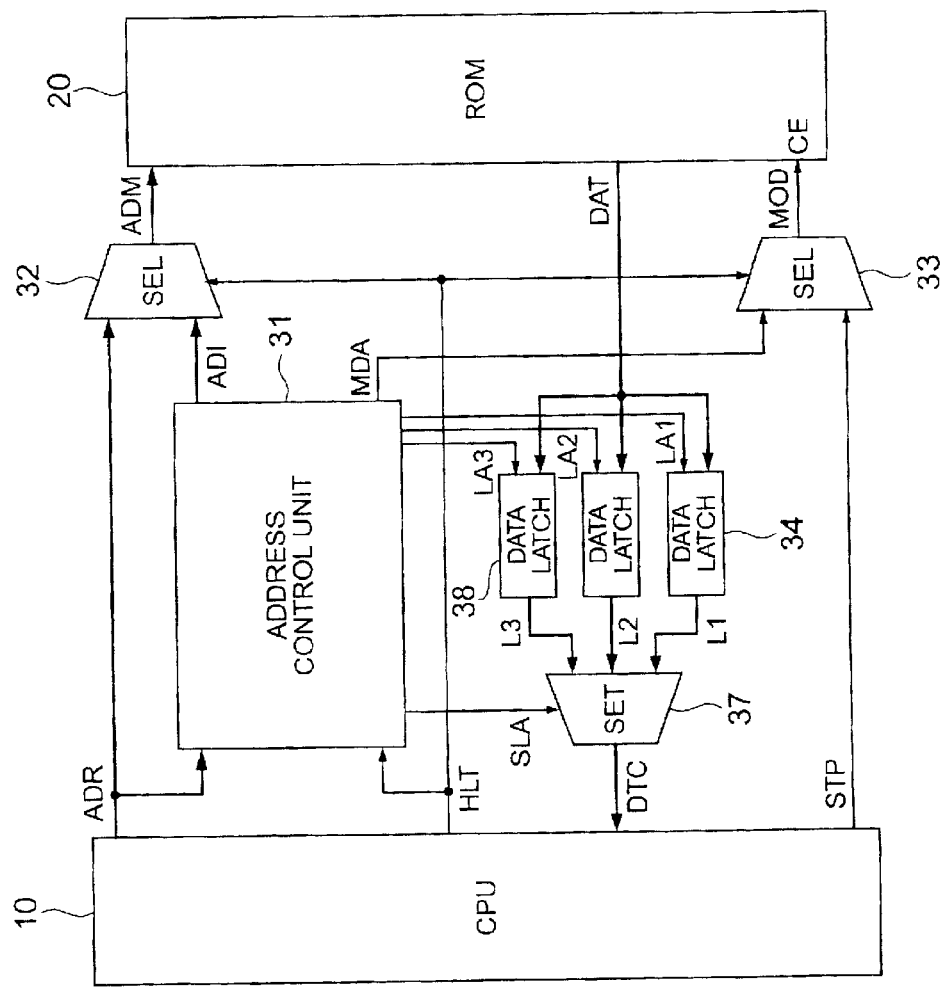
FIG. 2 is a block diagram of a microcontroller illustrating a first embodiment of the invention.

Referring to FIG. 2, a microcontroller according to a first embodiment of the invention comprises a CPU 10 and a ROM 20, such as a flash ROM, having a standby mode selected by high input to an enable terminal (CE). The data stored in the ROM 20 include a program executed by the CPU 10. The microcontroller also has various peripheral circuits, not shown in the drawing.

The CPU 10 outputs, for example, a sixteen-bit address signal ADR specifying an address in the ROM 20, and receives, for example, eight-bit data DTC stored at the specified address. The CPU 10 also outputs a halt signal (HLT) and a stop signal (STP), which are used to enter two different standby modes. The halt signal and stop signal are active high.

The HLT signal goes high when the CPU 10 executes a predetermined instruction, e.g., a HALT instruction. Following the HALT instruction, the CPU 10 holds the address signal ADR fixed and internally executes no-operation (NOP) instructions until it receives an interrupt signal from a peripheral circuit, at which point the HLT signal is driven low.

The STP signal goes high when the CPU 10 executes another predetermined instruction, e.g., a STOP instruction. Following execution of the STOP instruction, the CPU's clock signal is stopped and the CPU 10 stops operating completely until an interrupt signal is received, at which point the CPU's clock signal is reactivated and the STP signal is driven low.

The CPU 10 and ROM 20 are interconnected by a control circuit including an address control unit 31, a pair of selectors (SEL) 32, 33, three eight-bit data latches 34, 35, 36, and another selector 37.

The address control unit 31 receives the address signal ADR and halt signal HLT from the CPU 10 and generates an address signal ADI, a mode signal MDA, a selection signal SLA, and three latch signals LA1, LA2, LA3. The mode and latch signals MDA, LA1, LA2, LA3 are normally low, the selection signal SLA is normally in a first state, and address signal ADI is normally the same as address signal ADR. After the HLT signal goes high, however, the address control unit 31 increments address signal ADI twice and drives the latch signals LA1, LA2, LA3 high in turn, in response to a timing signal not shown in the drawing, then drives the mode signal MDA high and returns address signal ADI to the fixed value of address signal ADR.

When the HLT signal returns to the low logic level, the address control unit 31 returns the mode signal MDA to the low logic level. In accordance with the timing signal (not visible), the address control unit 31 also drives the selection signal SLA to a second state, then to a third state, and finally returns the latch selection signal to the first state.

Selector 32 receives address signal ADR and halt signal HTL from the CPU 10 and address signal ADI from the address control unit 31, and supplies a selected address signal ADM to the ROM 20. When the halt signal HLT is low, address signal ADR is selected as ADM. When the halt signal HLT is high, address signal ADI is selected as ADM.

Selector 33 receives the halt signal HLT and stop signal STP from the CPU 10 and the mode signal MDA from the address control unit 31, and supplies a mode signal MOD to the CE terminal of the ROM 20. When the halt signal HLT is low, the stop signal STP is selected as mode signal MOD. When the halt signal HLT is high, mode signal MDA is selected as mode signal MOD.

The data latches 34, 35, 36 receive data (DAT) read from the ROM 20, and receive respective latch signals LA1, LA2, LA3 from the address control unit 31. When, for example latch signal LA1 is low, data latch 34 operates transparently, passing the data received from the ROM 20 immediately to selector 37. When latch signal LA1 goes high, data latch 34 holds the data just received from the ROM 20 and continues output of the held data to selector 37 until latch signal LA1 goes low again. The other data latches 35, 36 operate similarly according to latch signals LA2 and LA3. The data output from data latches 34, 35, 36 will be denoted L1, L2, L3, respectively.

Selector 37 receives selection signal SLA from the address control unit 31 and the data L1, L2, L3 output from data latches 34, 35, 36, and provides selected data DTC to the CPU 10, selecting latch data L1 when SLA is in the first state, latch data L2 when SLA is in the second state, and latch data L3 when SLA is in the third state.

The operation of the first embodiment will be described with reference to FIG. 3.

During normal operation, the halt signal HLT and stop signal STP are both low (L), the latch signals LA1, LA2, LA3 are all low, and the selection signal SLA is in its first state. The address signal ADR from the CPU 10 is selected by selector 32 and supplied to the ROM 20 as address signal ADM. In effect, the ROM 20 receives the address signal ADR output by the CPU 10 and responds with the output of eight-bit data DAT. Data latch 34 and selector 37 pass data DAT to the CPU 10 as data DTC. By generating successive addresses, the CPU 10 reads the contents of the ROM 20, executes the program stored therein, and carries out the control processing encoded in the program.

Figure 3:
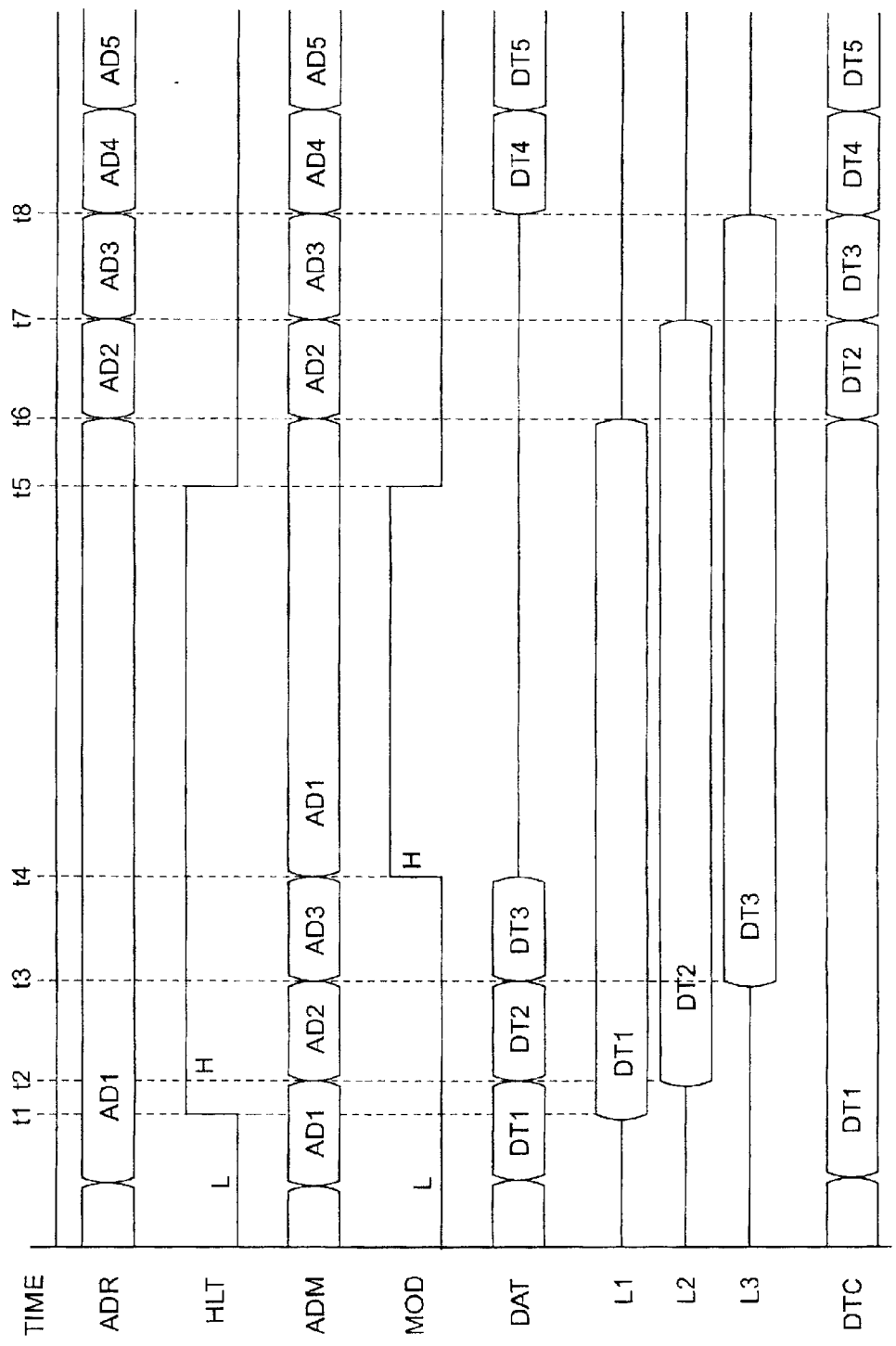
FIG. 3 is a timing diagram illustrating the operation of the first embodiment.

At time t1 in FIG. 3, the CPU 10 executes a HALT instruction and activates the HLT signal by driving it to the high (H) logic level. While HLT is high, the address signal ADR output from the CPU 10 remains fixed at the value AD1 generated just before HLT went high, and selectors 32 and 33 select the address signal ADI and mode signal MDA output from the address control unit 31 as address signal ADM and mode signal MOD. Initially, ADM (ADI) is equal to AD1 and MOD (MDA) is low. The ROM 20 therefore continues output of the data DT1 stored at address AD1. The address control unit 31 also drives latch signal LA1 high, causing data latch 34 to hold data DT1 for output as latch data L1. Selector 37 selects DT1 as the data DTC supplied to the CPU 10.

At time t2, the address control unit 31 increments address signal ADI (selected as ADM) from AD1 to AD2. The ROM 20 responds with output of the data DT2 stored at address AD2. Next, the address control unit 31 drives latch signal LA2 high, causing data latch 35 to hold data DT2 as latch data L2.

At time t3, the address control unit 31 increments address signal ADI from AD2 to AD3. The ROM 20 responds with output of the data DT3 stored at address AD3. Next, the address control unit 31 drives latch signal LA3 high, causing data latch 36 to hold data DT3 as latch data L3.

At time t4, the address control unit 31 returns address signal ADI (selected as ADM) to its previous value AD1, and activates mode signal MDA (selected as MOD) by driving it to the high logic level. When the MOD signal goes high, the ROM 20 enters the standby mode and discontinues output of data DAT, thereby reducing power consumption.

At time t5, a peripheral circuit generates a CPU interrupt. The CPU 10 resumes normal operation and inactivates the HLT signal by driving it to the low logic level. Selectors 32 and 33 now select the address signal ADR and stop signal STP output from the CPU 10 as address signal ADM and mode signal MOD. The stop signal STP remains low, so the mode signal MOD returns to the low (inactive) level and the ROM 20 begins the process of resuming normal operation. The latch signals LA1, LA2, LA3 (not visible) remain high, so data latches 34, 35, 36 continue to hold data DT1, DT2, DT3, respectively. Reliable data output from the ROM 20 does not begin immediately, but the CPU 10 continues to receive data DT1 from data latch 34 via selector 37.

At time t6, the CPU 10 begins output of address AD2 as the address signal ADR, and the address control unit 31 changes the selection signal SLA from the first state to the second state. Selector 37 now selects the latch data L2 from data latch 35 as the data DTC supplied to the CPU 10. The CPU 10 accordingly receives the data DT2 stored at address AD2 in the ROM 20, even though the ROM 20 has not resumed reliable data output yet.

At time t7, the CPU 10 begins output of the next address AD3, and the address control unit 31 changes the selection signal SLA from the second state to the third state. Selector 37 selects the latch data L3 from data latch 36 as data DTC, so the CPU 10 receives the data DT3 stored at address AD3 in the ROM 20, even though the ROM 20 still has not resumed reliable data output.

The address control unit 31 returns latch signals LA1 and LA2 to the low level at times t6 and t7, respectively. At time t8, the address control unit 31 returns latch signal LA3 to the low level, and returns selection signal SLA from the third state to the first state, while the CPU 10 begins output of the next address AD4. By this time the ROM 20 is ready to resume output of reliable data (DAT). Data latch 34 and selector 37 pass the data DT4 stored at address AD4 in the ROM 20 to the CPU 10, as data DTC.

Normal operation then continues, the CPU 10 next reading data DT5 from address AD5 in the ROM 20.

In the first embodiment, during the standby mode following execution of the HALT instruction, the ROM 20 can be placed in deep standby to minimize power consumption, because extra time is provided at the end of the standby mode before the ROM 20 is required to produce reliable output data. Malfunctions on exit from the standby mode are prevented because while the output of the ROM 20 is unstable, the CPU 10 receives reliable data from the data latches 34, 35, 36.

When the CPU 10 enters the standby mode by executing a STOP instruction and driving the STP signal high, since the CPU's clock signal is stopped, the process of recovery from the standby mode differs from that described above, and the problem of unstable data output from the ROM 20 does not arise, even if the ROM's deep standby mode is used.

In a variation of the first embodiment, at the end of the standby mode following execution of the HALT instruction, the CPU 10 resumes program execution from a predetermined address (address zero, for example). In this case, the address control unit 31 generates that address (e.g., address zero) and the two subsequent addresses, and the data stored at those addresses in the ROM 20 are held in the data latches 34, 35, 36 during the standby mode.

Figure 4:
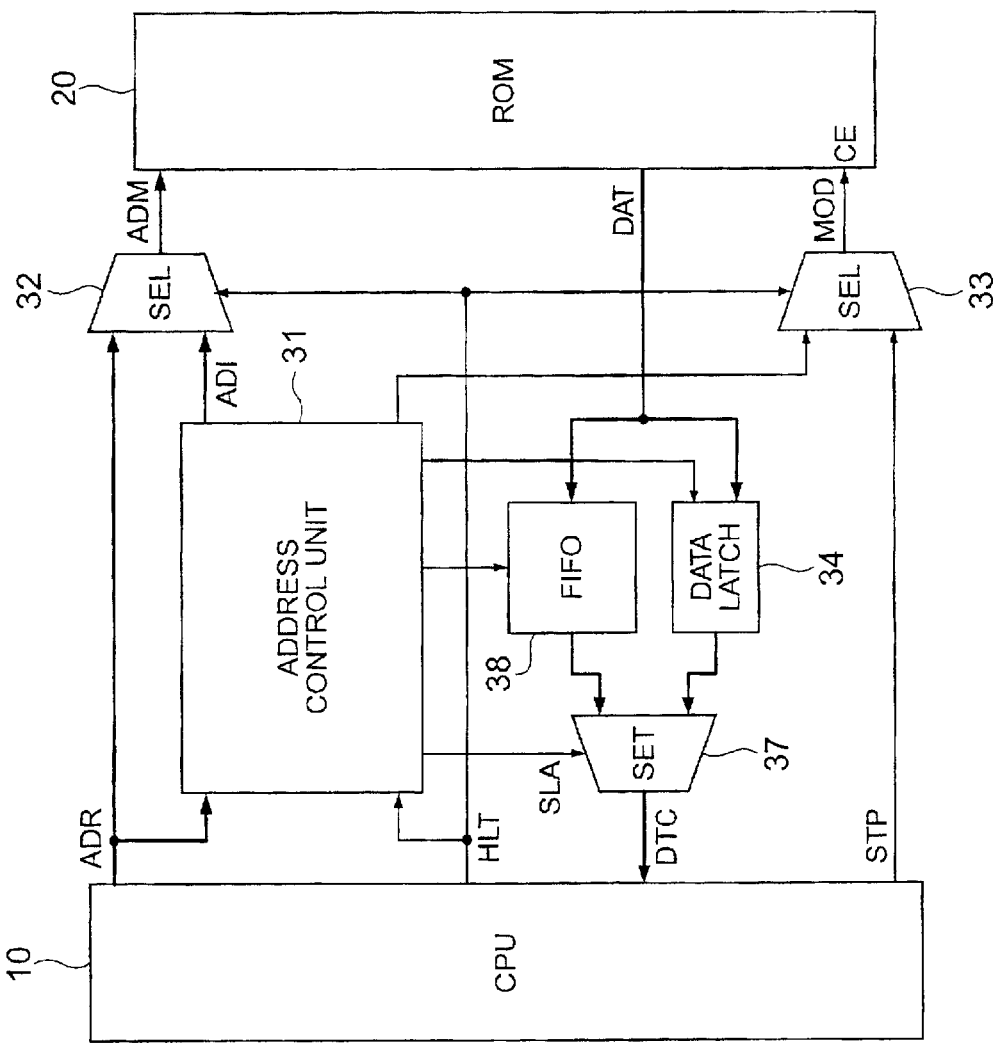
FIG. 4 is a block diagram of a microcontroller illustrating a second embodiment.

Referring to FIG. 4, a second embodiment of the invention replaces data latches 35, 36 with a first-in-first-out (FIFO) memory 38. The other constituent elements of the second embodiment are similar to the corresponding elements of the first embodiment, except that the address control unit 31 generates FIFO control signals in place of latch signals LA2 and LA3, and the selection signal SLA has only two states.

The second embodiment operates in substantially the same way as the first embodiment. When a HALT instruction is executed, the address control unit 31 controls the ROM 20, data latch 34, and FIFO memory 38 so that the data stored at a plurality of consecutive addresses in the ROM 20 are moved into data latch 34 and the FIFO memory 38. At the end of the standby mode, these data are output from data latch 34 and the FIFO memory 38 to the CPU 10 through selector 37, giving the ROM 20 time to recover from deep standby before having to provide reliable output data.

Figure 5:
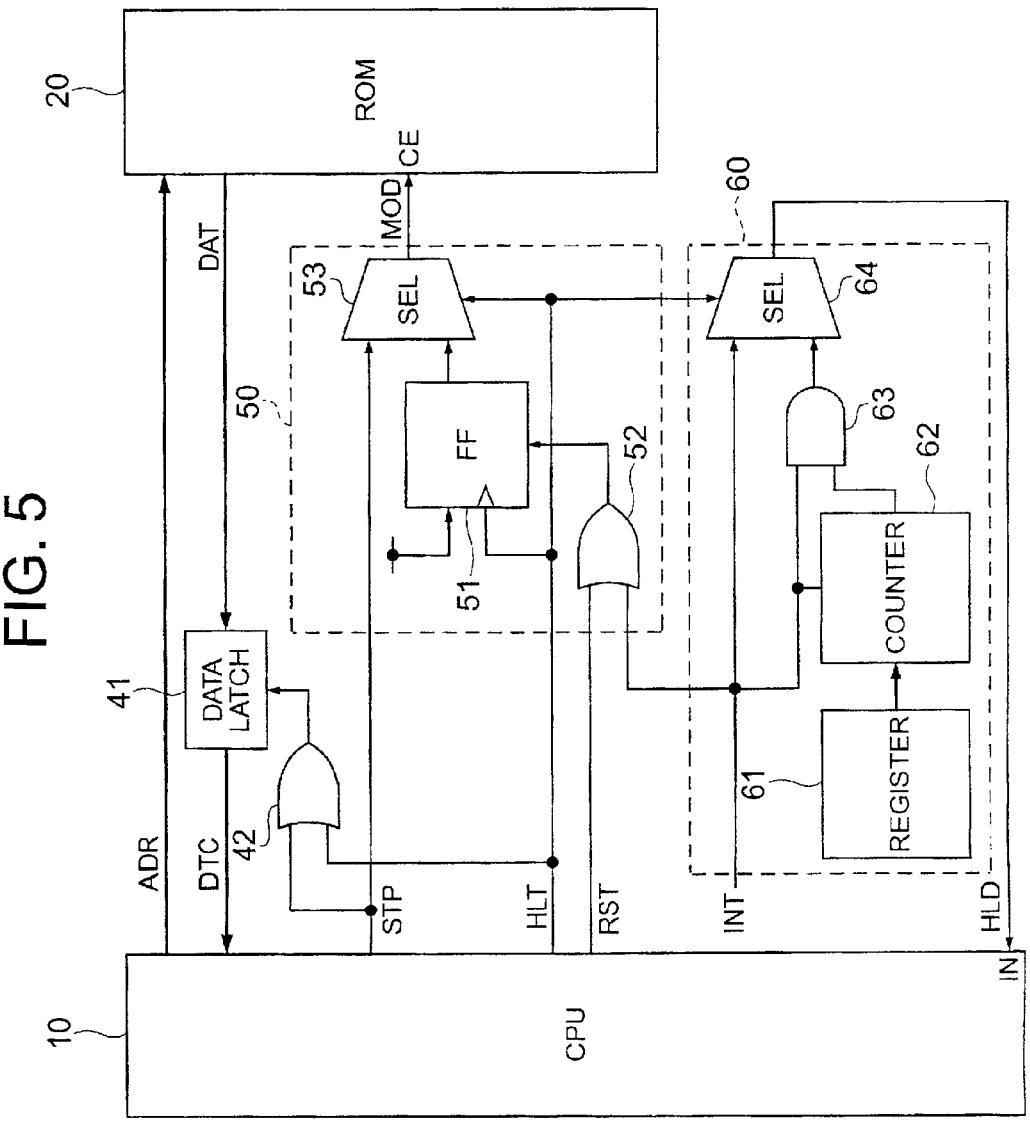
FIG. 5 is a block diagram of a microcontroller illustrating a third embodiment.

Referring to FIG. 5, a third embodiment of the invention comprises a CPU 10, ROM 20, and peripheral circuits as described above. The address signal ADR from the CPU 10 is supplied directly to the ROM 20. The data DAT output from the ROM 20 are supplied to a data latch 41 controlled by an OR gate 42. The OR gate 42 takes the logical OR of the stop signal STP and halt signal HLT output from the CPU 10. The CPU 10 receives the data DTC output from the data latch 41.

The operating mode of the ROM 20 is controlled by a mode control unit 50 comprising a flip-flop (FF) 51, an OR gate 52, and a selector 53. The OR gate 52 receives a reset signal RST from the CPU 10 and an interrupt signal INT. The signal output from the OR gate 52 resets the flip-flop 51 to the low output state. The flip-flop 51 also receives the halt signal HLT as a clock signal, and receives a fixed high-logic-level signal as a data input signal. The selector 53 receives the stop signal STP and the output of the flip-flop 51, selecting the former when the halt signal HLT is low and the latter when HLT is high. The signal selected by the selector 53 is supplied as a mode signal MOD to the CE terminal of the ROM 20.

The interrupt signal INT originates from, for example, a peripheral circuit (not visible). INT goes to the high logic level when the peripheral circuit requests a CPU interrupt, and remains high until reset by the CPU 10.

The interrupt signal INT is also supplied to an interrupt control unit 60 comprising a register 61, a counter 62, an AND gate 63, and a selector 64. The register 61 stores a constant value X, which is supplied to the counter 62. Starting when the interrupt signal INT goes high, the counter 62 counts clock signals (not visible), and generates a high count-out signal when the number of clock signals counted reaches the value X stored in the register 61. The AND gate 63 takes the logical AND of the count-out signal and the interrupt signal INT. Selector 64 selects the interrupt signal INT when the halt signal HLT is low, and selects the output of the AND gate 63 when HLT is high. The output of selector 64 is an interrupt hold signal HLD that is supplied to an interrupt terminal IN of the CPU 10.

The constant value X stored in the register 61 is sufficiently large so that the time taken by the counter 62 to count X clock cycles is equal to or greater than the time required by the ROM 20 to resume reliable data output after exiting the standby mode.

The operation of the third embodiment will be described with reference to FIG. 6.

Normally, the halt signal HLT and stop signal STP are both low (L), the mode signal MOD input to the ROM 20 is therefore low, and the flip-flop 51 is in the reset state. The data DAT read from the ROM 20 pass through the data latch 41 to the CPU 10 as data DTC.

Figure 6:
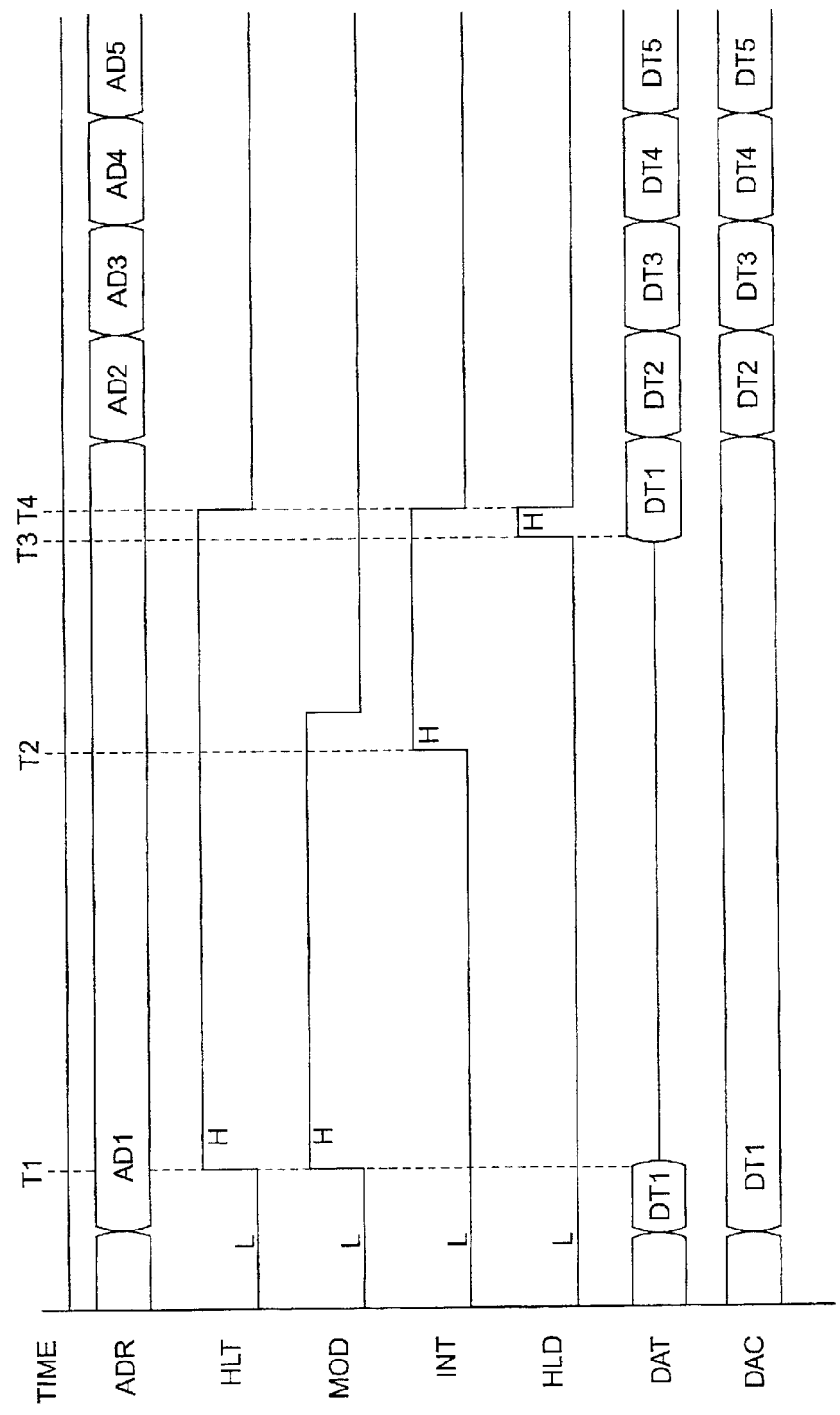
FIG. 6 is a timing diagram illustrating the operation of the third embodiment.

At time T1 in FIG. 6, during output of address AD1, the CPU 10 executes a HALT instruction and activates the HLT signal by driving it to the high logic level (H). The high HLT signal sets the flip-flop 51 and simultaneously causes selector 53 to select the high output of the flip-flop 51. The mode signal MOD accordingly goes high (active), placing the ROM 20 in the standby mode.

While the halt signal HLT remains high, the CPU 10 continues to output address AD1, and to receive the corresponding data DT1 from the data latch 41. The ROM 20 discontinues output of data DAT, however.

At time T2 in FIG. 6, the interrupt signal INT is driven high by, for example, a peripheral circuit, resetting the flip-flop 51 via OR gate 52. The mode signal MOD output from selector 53 therefore goes low (inactive), and the ROM 20 begins the process of returning from the standby mode to the normal mode.

The high interrupt signal also activates the counter 62 in the interrupt control unit 60, which starts counting down from the constant value X stored in the register 61.

At time T3, while the interrupt signal INT and halt signal HLT are still high, the counter 62 reaches zero and generates a high count-out signal. Both inputs to the AND gate 63 are now high, so the output of the AND gate goes high. This output is selected by selector 64, because HLT is high, so the interrupt hold signal HLD now goes high. Accordingly, the interrupt input terminal of the CPU 10 goes high, and the CPU begins processing the interrupt. Data output (DAT) from the ROM 20 also resumes at (or before) this time.

At time T4, the CPU 10 resets the halt signal HLT and interrupt signal INT to the low (inactive) level. The CPU 10 continues to output address AD1 and to receive data DT1 from the data latch 41. Normal operation now resumes, the CPU 10 sending addresses AD2, AD3, AD4, AD5, ... to the ROM 20 and receiving corresponding data DT2, DT3, DT4, DT5, ... from the ROM 20 through the data latch 41.

In the third embodiment, the interrupt signal INT immediately returns the ROM 20 from the standby mode to the normal mode, but the interrupt signal INT is delayed in the interrupt control unit 60 and is not supplied to the CPU 10 (as the interrupt hold signal HLD) until sufficient time has elapsed for the ROM output to stabilize. Accordingly, the ROM 20 can be placed in a deep standby mode without the risk of malfunction due to unstable data output on exit from standby.

Compared with the first two embodiments, the third embodiment has the advantage of a simpler circuit configuration.

Figure 7:
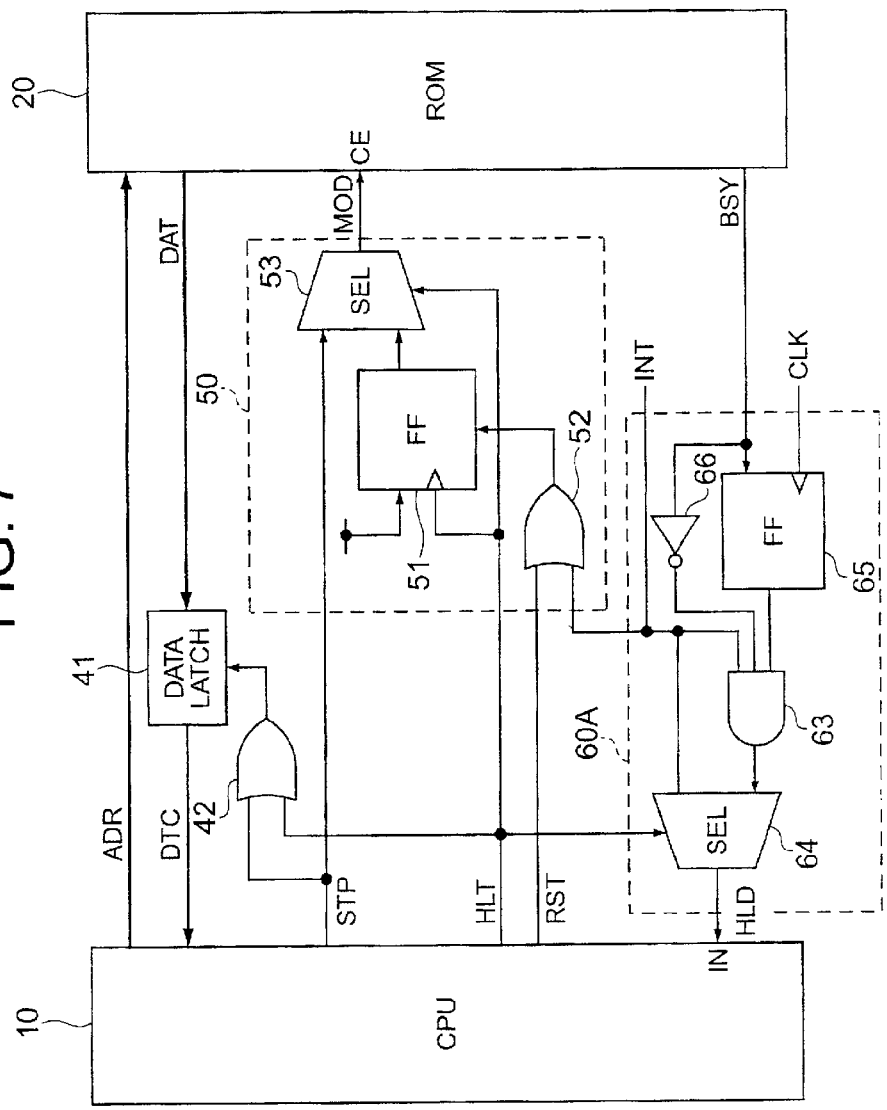
FIG. 7 is a block diagram of a microcontroller illustrating a fourth embodiment.

Referring to FIG. 7, a fourth embodiment of the invention replaces the interrupt control unit 60 of the third embodiment with a modified interrupt control unit 60A. The interrupt control unit 60A comprises an AND gate 63 and selector 64 essentially as described in the third embodiment, a flip-flop 65, and a logical NOT gate or inverter 66.

The ROM 20 in the fourth embodiment generates a busy signal (BSY) that is normally low, but goes high when the ROM 20 is unable to generate output data. The busy signal BSY is supplied as a data signal to the flip-flop 65 and inverter 66. The flip-flop 65 also receives a clock signal (CLK). The outputs of the flip-flop 65 and inverter 66, together with the interrupt signal INT, are supplied to the AND gate 63.

The operation of the fourth embodiment will be described with reference to FIG. 8.

Normally, the halt signal HLT, stop signal STP, and busy signal BSY are all low (L), and the data DAT read from the ROM 20 pass through the data latch 41 to the CPU 10 as data DTC, as in the third embodiment.

Figure 8:
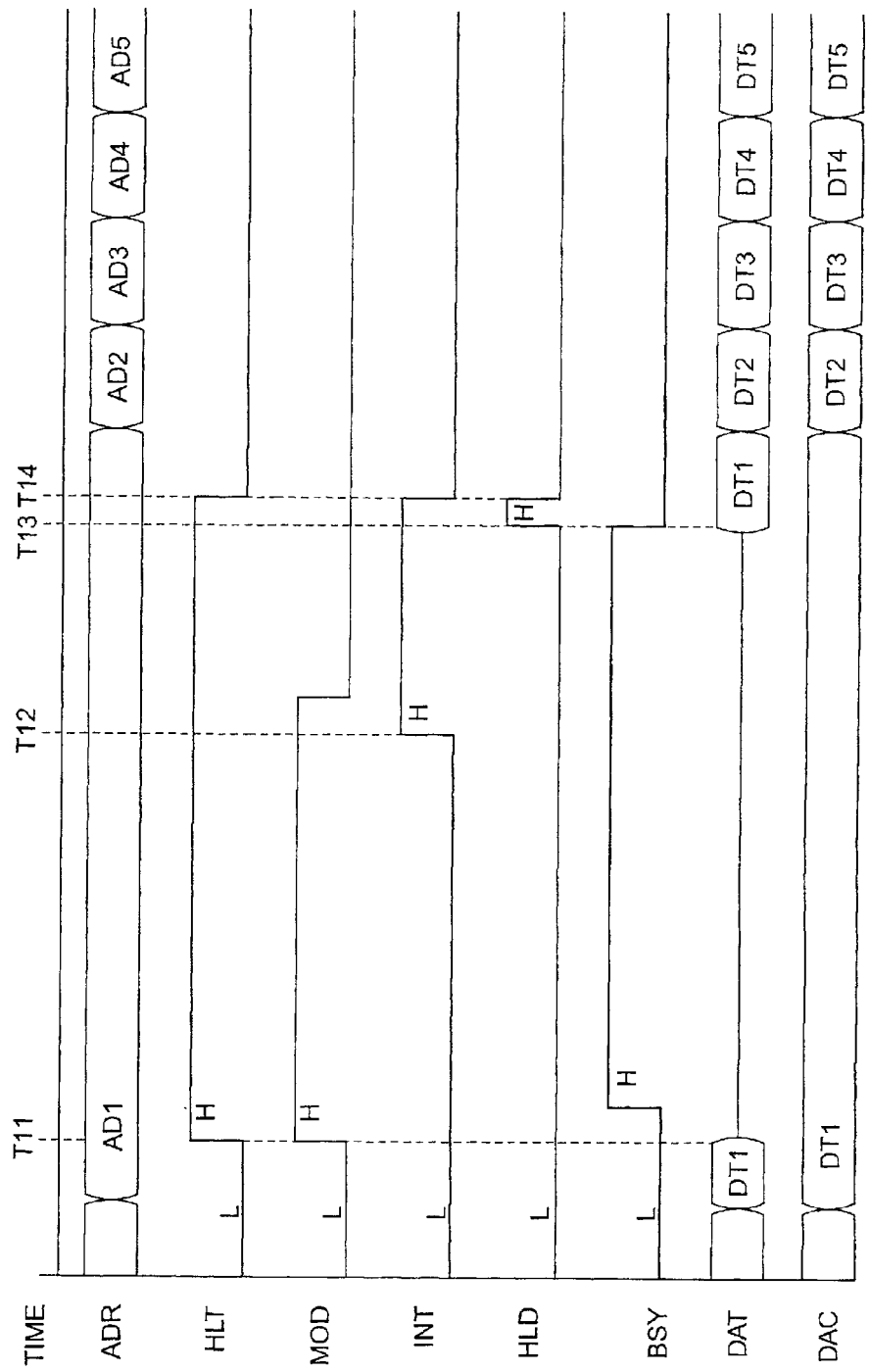
FIG. 8 is a timing diagram illustrating the operation of the fourth embodiment.

At time T11 in FIG. 8, during output of address AD1, the CPU 10 executes a HALT instruction and drives the HLT signal to the high logic level (H). The high HLT signal results in a high mode signal MOD as explained in the third embodiment, placing the ROM 20 in the standby mode, in which output of data DAT is discontinued, although the CPU 10 continues to receive data DT1 as data DTC from the data latch 41. The busy signal BSY goes high shortly after the ROM 20 enters the standby mode. The output of the AND gate 63 is low before BSY goes high, because the output of the flip-flop 51 is low, and remains low after BSY goes high, because the output of inverter 66 is then low. The output of the AND gate 63 is selected by selector 64 because the halt signal HLT is high. The signal received at the interrupt input terminal of the CPU 10 therefore remains low.

At time T12, the interrupt signal INT is driven high by, for example, a peripheral circuit, resetting flip-flop 51. The mode signal MOD output from selector 53 goes low and the ROM 20 begins the process of returning from the standby mode to the normal mode. The busy signal BSY remains high for the time being, so the outputs of inverter 66, AND gate 63, and selector 64 remain low, and the CPU 10 does not yet receive notification of the interrupt.

At time T13, the ROM 20 resumes data output and the busy signal BSY returns to the low logic level. For one cycle of the clock signal CLK, the outputs of both the flip-flop 65 and inverter 66 are now high. Since the interrupt signal INT is also high, the output of the AND gate 63 goes high, and the interrupt hold signal HLD received by the CPU 10 goes high, notifying the CPU of the interrupt.

At time T14, the CPU 10 resets the halt signal HLT and interrupt signal INT to the low logic level. Normal operation then resumes as in the third embodiment.

Compared with the third embodiment, the fourth embodiment recovers more quickly from the standby mode, because the low-to-high transition of the interrupt hold signal HLD is timed coincide with the high-to-low transition of the busy signal BSY. That is, the CPU 10 resumes normal operation as soon as the ROM 20 is ready to resume data output.

The interrupt control unit also has a simpler configuration in the fourth embodiment than in the third embodiment, not requiring a counter.

The invention is not limited to the foregoing embodiments, but includes many variations, some of which are as follows.

The number of data latches in the first embodiment is not limited to three. The number of data latches should be adjusted according to the time required for the ROM to recover from the standby mode.

It is not necessary for the CPU to generate a stop signal STP. If the CPU does not generate the STP signal, selector 33 can be eliminated in the first and second embodiments, and selector 53 in the third and fourth embodiments.

The ROM need not be a flash ROM, but can be any type of ROM that requires extra time to recover from a standby mode.

Those skilled in the art will recognize that further variations are possible within the scope claimed below.

What is claimed is:

1. A microcontroller comprising:
   a central processing unit generating a first address signal and executing a program including an instruction that causes the central processing unit to activate a halt signal, to stop executing the program until an interrupt signal is received, and then to inactivate the halt signal;
   a memory storm data including said program, receiving a mode signal, outputting the stored data when the mode signal is inactive, and discontinuing output of the stored data when the mode signal is active; and
   a control circuit receiving the halt signal from the central processing unit, the control circuit including an address control unit generating a second address signal for reading said part of the program, and a selector receiving the first address signal and the second address signal, selecting the first address signal when the halt signal is inactive, selecting the second address signal when the halt signal is active, and supplying the selected address signal to the memory, wherein, when the halt signal is activated, the control circuit reads said part of the program from the memory, internally stores said part of the program, then activates the mode signal, and wherein, when the halt signal is inactivated, the control circuit inactivates the mode signal and supplies the central processing unit with the internally stored part of the program.

2. The microcontroller of claim 1, wherein the control circuit further comprises a plurality of data latches for storing said part of the program.

3. The microcontroller of claim 1, wherein the control circuit further comprises a first-in-first-out memory for storing said part of the program.

4. A microcontroller comprising:

a central processing unit executing a program including an instruction that causes the central processing unit to activate a halt signal, to stop executing the program until an interrupt signal is received, and then to inactivate the halt signal;

a memory storing data including said program, receiving a mode signal, outputting the stored data when the mode signal is inactive, discontinuing output of the stored data when the mode signal is active, and generating a busy signal indicating whether the memory is ready to resume data output; and a control circuit receiving the busy signal and the interrupt signal, the control circuit including a flip-flop delaying said busy signal, an inverter inverting said busy signal, and a logic gate for passing the interrupt signal to the central processing unit, said logic gate receiving the interrupt signal, the delayed busy signal from the flip-flop, and the inverted busy signal from the inverter, wherein, when the halt signal is activated, the control circuit activates the mode signal, and wherein, when the control circuit receives the interrupt signal, the control circuit inactivates the mode signal, waits for the memory to resume data output, and then sends the interrupt signal to the central processing unit.

5. A microcontroller comprising:

a central processing unit executing a program including an instruction that causes the central processing unit to activate a halt signal, to stop executing the program until an interrupt signal is received, and then to inactivate the halt signal;

a memory storing data including said program, receiving a mode signal, outputting the stored data when the mode signal is inactive, and discontinuing output of the stored data when the mode signal is active; and a control circuit through which the interrupt signal is passed to the central processing unit, the control circuit including a flip-flop for generating the mode signal, said flip-flop being set by the halt signal and reset by the interrupt signal, wherein, when the halt signal is activated, the control circuit activates the mode signal, and wherein, when the control circuit receives the interrupt signal, the control circuit inactivates the mode signal, waits for the memory to resume data output, and then sends the interrupt signal to the central processing unit.

6. The microcontroller of claim 5, wherein the control circuit further comprises a counter for generating a delay from input of the interrupt signal to output of the interrupt signal.

7. The microcontroller of claim 6, wherein the control circuit further comprises a logic gate for passing the interrupt signal to the central processing unit, said logic gate receiving the interrupt signal and an output signal from the counter.

* * * * *